US009695863B2

(12) United States Patent
Moule

(10) Patent No.: US 9,695,863 B2
(45) Date of Patent: Jul. 4, 2017

(54) CLIP FOR PIN RETENTION

(71) Applicant: ROHR, INC., Chula Vista, CA (US)

(72) Inventor: John Moule, Spring Valley, CA (US)

(73) Assignee: Rohr, Inc., Chula Vista, CA (US)

( * ) Notice: Subject to any disclaimer, the term of this patent is extended or adjusted under 35 U.S.C. 154(b) by 189 days.

(21) Appl. No.: 14/546,559

(22) Filed: Nov. 18, 2014

(65) Prior Publication Data
US 2016/0138643 A1 May 19, 2016

(51) Int. Cl.
*F16B 21/18* (2006.01)
*F16B 41/00* (2006.01)
*F16B 2/24* (2006.01)
*F16B 1/00* (2006.01)

(52) U.S. Cl.
CPC ............ *F16B 41/002* (2013.01); *F16B 2/245* (2013.01); *F16B 21/18* (2013.01); *F16B 21/186* (2013.01); *F16B 1/0071* (2013.01)

(58) Field of Classification Search
CPC ................................. F16B 21/18; F16B 21/186
USPC ................. 411/530, 522, 517; 292/140, 143; 282/305
See application file for complete search history.

(56) References Cited

U.S. PATENT DOCUMENTS

| | | | | | |
|---|---|---|---|---|---|
| 1,513,710 | A | * | 10/1924 | Lewis | A44B 17/0011 24/110 |
| 1,782,196 | A | * | 11/1930 | Dalton | F16B 2/248 172/750 |
| 2,646,713 | A | * | 7/1953 | Summerbell | F16B 21/186 384/425 |
| 3,314,696 | A | * | 4/1967 | Ferguson | F16L 37/088 24/665 |
| 3,534,988 | A | * | 10/1970 | Lindsey | F16L 13/166 285/305 |
| 4,244,608 | A | * | 1/1981 | Stuemky | F16L 37/144 24/545 |
| 7,390,068 | B2 | * | 6/2008 | Smith | A47L 9/009 24/547 |
| 2007/0071578 | A1 | | 3/2007 | Shinozaki et al. | |
| 2013/0319172 | A1 | | 12/2013 | Uhl | |

FOREIGN PATENT DOCUMENTS

GB 987717 3/1965

OTHER PUBLICATIONS

Extended European Search Report dated Mar. 1, 2016 in European Application No. 15194520.1.

* cited by examiner

*Primary Examiner* — Flemming Saether
(74) *Attorney, Agent, or Firm* — Snell & Wilmer L.L.P.

(57) ABSTRACT

A retention clip is provided. The retention clip comprises a spring section, a first elbow section extending from the spring section, a handle section extending from the first elbow section, and a second elbow section opposite the first elbow section. The second elbow section may extend between the handle section and the spring section. A retention assembly is also provided. The retention assembly may comprise a mounting fitting and a housing disposed in the mounting fitting. The housing may define a perimeter of an opening. A retention clip may be disposed around the housing with an elbow section extending into the perimeter to obstruct the opening.

12 Claims, 6 Drawing Sheets

CLIP FOR PIN RETENTION

FIELD OF INVENTION

The present disclosure relates to part replacement on an aircraft, and, more specifically, to a retention clip for fast part replacement.

BACKGROUND

An aircraft comprises various parts that may be subject to wear and tear over the service life of the aircraft. Some components may age or fail. Maintenance crews may replace the components as appropriate in response to the wear. To maximize aircraft availability, maintenance teams strive to minimize the replacement time for worn components. However, maintenance teams rely on tools to change components, which add to the time spent to find, use, and replace the tool. Furthermore, maintenance teams may wear gloves that limit their dexterity when changing components.

Reverse-thrust actuators are an example of a component requiring replacement during the service life of an aircraft. A gimbal pin may hold an actuator in place and may be removed to replace the actuator. Additional complexity associated with removal of the pins make actuator replacement time consuming Using removable fasteners and tools while wearing gloves may lead to a maintenance engineer dropping a tool or fastener. Drops can lead to lost fasteners or tools and further increase aircraft downtime.

SUMMARY

A retention clip is provided. The retention clip comprises a spring section, a first elbow section coupled to the spring section, a handle section coupled the first elbow section, and a second elbow section opposite the first elbow section. The second elbow section may be coupled between the handle section and the spring section.

In various embodiments, a cam handle may be configured to rotate around the handle section. The cam handle can include a visual indicator configured to indicate whether the cam handle is in a closed or open position. The spring section may define an opening. The spring section may be configured to load in response to a force applied to the handle section. A central portion of the spring section may be a closest portion of the spring section to the handle section as a result of the retention clip being in a closed position.

A retention assembly is also provided. The retention assembly may comprise a mounting fitting and a housing disposed in the mounting fitting. The housing may define a perimeter of an opening. A retention clip may be disposed around the housing with an elbow section extending into the perimeter to obstruct the opening.

In various embodiments, the housing may define a slot with the elbow section extending into the slot. A handle section may be coupled to the elbow section and configured to move the elbow section relative to the slot. A cam handle may be configured to rotate around the handle section. The cam handle can include a visual indicator configured to indicate whether the cam handle is in a closed or open position. A spring section may be coupled to the elbow section. The spring section may be discontinuous. The spring section can be configured to load in response to a force applied to the handle section. A pin may be disposed in the housing and held within the opening by the retention clip.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The scope of the disclosure is defined by the appended claims. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

The retention clip of the present disclosure may remain attached to a housing while in the open or closed position. As a result, the retention clip is unlikely to be lost or dropped when moved between open and closed positions. Furthermore, the retention clip may be opened without tools by utilizing an integrated handle and/or human hands. As a result, the complexity and time cost of changing components retained by the retention clip may be reduced.

Figure 1A:
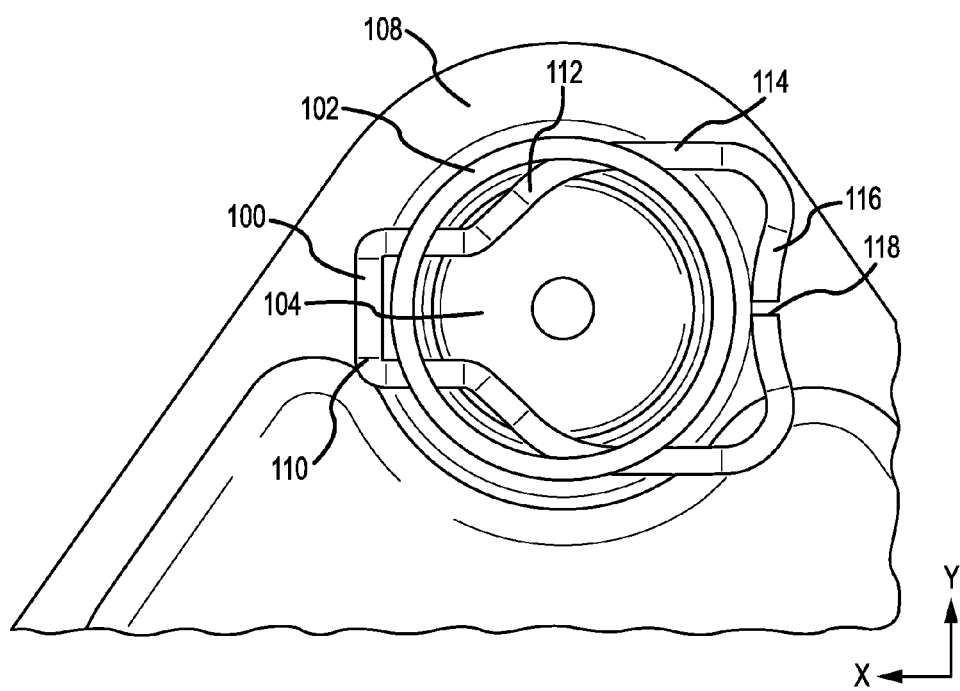
FIG. 1A illustrates a retention assembly comprising a retention clip in a closed position securing a pin, in accordance with various embodiments.

With reference to FIG. 1A, a retention clip 100 is shown in housing 102 holding pin 104 in place, in accordance with various embodiments. Housing 102 may be formed integrally with mounting fitting 108. Pin 104 may be inserted into housing 102 and may slide into and out housing 102 through the circular opening in a direction orthogonal to the x and y axes. Housing 102 may have a circular opening bored through mounting fitting 108 for pin 104 to pass into housing 102 and project out mounting fitting 108. In that regard, pin 104 may hold a component (e.g., an actuator) in place by projecting into the component with a head (illustrated below in FIG. 3) of pin 104 retained in housing 102.

In various embodiments, retention clip 100 may comprise a handle section 110. Handle section 110 may project outward from housing 102. Handle section 110 may be configured to enable a human finger, screwdriver, lever, or clip to engage retention clip 100 and press between handle section 110 and housing 102. In that regard, handle section 110 allows a user to open clip 100 by applying force to retention clip 100 through handle section 110. Handle section 110 may be disposed outside a boundary of housing 102 with a portion of retention clip 100 extending inside a perimeter of housing 102 to form elbow sections 112 of retention clip 100. The perimeter of housing 102 may be defined by a circle in the xy plane. Retention clip 100 may comprise two elbow sections 112 disposed inside a perimeter of housing 102 to partially cover pin 104 when retention clip 100 is in the closed position. In that regard, pin 104 may contact elbow sections 112 of retention clip 100 and be restrained from motion orthogonal to the x and y axes housing 102 by elbow sections 112, which obstruct the opening of housing 102. Thus, elbow sections 112 of retention clip 100 tend to retain pin 104 within housing 102. Body section 114 of retention clip 100 extends between elbow section 112 (extending inside the perimeter of housing 102) and spring section 116 (disposed outside the perimeter of housing 102).

In various embodiments, spring section 116 of retention clip 100 may be disposed outside a perimeter of housing 102 on the opposite side of housing 102 from handle section 110. Spring section 116 may comprise an opening 118 completely through retention clip 100, making retention clip 100 discontinuous. Opening 118 may be defined by two adjacent ends of retention clip 100 in spring section 116. Opening 118 allows easy installation of retention clip 100 in a more flexible state. Opening 118 in spring section 116 may be small such that edges in spring section 116 defining opening 118 may be in contact when retention clip 100 is in a closed position. In various embodiments, opening 118 of retention clip 100 may be closed through, e.g. a weld, after installation or left open for easy replacement. Opening 118 may correspond with a contact point of spring section 116 against the outer perimeter of housing 102. Spring section 116 may extend from a joint with body section 114 towards handle section 110. Thus, the contact point (i.e., a central portion) of spring section 116 may be the closest portion of spring section 116 to handle section 110 as a result of retention clip 100 being in a closed position. Spring section 116 biases handle section 110 of retention clip 100 inward (i.e., towards spring section 116) so that retention clip 100 is held tight in the closed position (i.e., with elbow section 112 obstructing the opening of housing 102). Thus, spring section 116 may provide tension in retention clip 100 that presses against housing 102 in the closed position to retain retention clip 100 on housing 102. Retention clip 102 may be spring biased in the closed position to reduce vibration during use. In that regard, spring section 116 may be formed to converge towards handle section 110 as spring section 116 extends from body section 114.

In various embodiments, retention clip 100 may be made from metal (e.g., steel). Retention clip 100 may be made by bending a metal bar into the desired shape, for example. The spring constant of retention clip 100 may be increased by increasing the cross-sectional area of retention clip 100. Retention clip may also include a substantially constant cross sectional area through handle section 110, elbow section 112, body section 114, and spring section 116. For example, retention clip 100 may comprise a diameter of approximately 2.5 mm (0.1 inches) and a cross sectional area of 4.9 square mm (0.007 square inches).

Figure 1B:
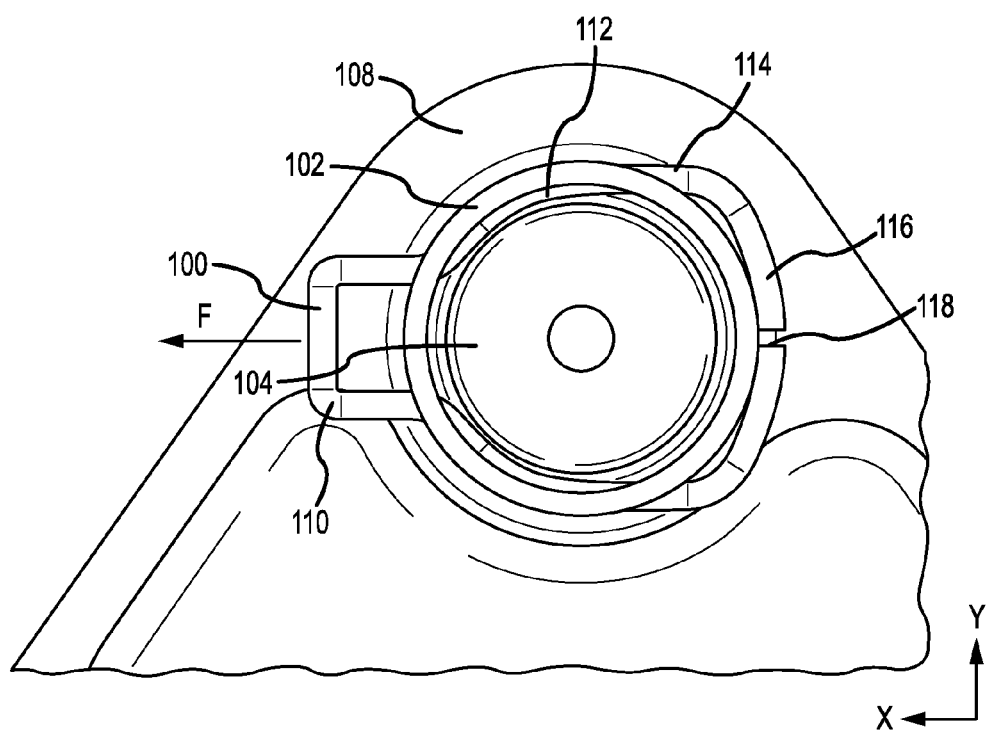
FIG. 1B illustrates a retention clip in an open position to allow extraction of a pin, in accordance with various embodiments.

With reference to FIG. 1B, a retention clip 100 is shown in an open position in housing 102, clearing a path to remove pin 104 in a direction orthogonal to the xy plane. Handle section 110 of retention clip 100 is moved away from housing 102 by applying a force F to handle section 110. Handle section 110 exerts a tension on elbow section 112 that pulls elbow section 112 towards handle section 110. In response to force F, elbow section 112 deforms and moves toward handle section 110. Elbow section 112 exerts tension on body section 114 and pulls body section 114 in the direction of handle section 110. Body section 114 exerts compression on spring section 116 and elastically deforms (ie., flexes) spring section 116 so that the bend between body section 114 and spring section 116 may move towards handle section 110. The contact point of spring section 116 against housing 102 may remain at substantially the same point against housing 102. In embodiments where opening 118 is not closed, as in FIG. 1B, then opening 118 may expand slightly in response to a force exerted by flexing spring section 116.

Elbow section 112 and other portions of retention clip 100 may no longer cover pin 104 in housing 102 in response to retention clip 100 being in an open position. Stated another way, the entire outer perimeter of pin 104 may be unobstructed by retention clip 100 when looking down the opening defined by bore of housing 102. Thus, when retention clip 100 is in an open position, an exit/entry path in housing 102 for pin 104 to be inserted and/or removed from housing 102 is created. In that regard, when retention clip 100 is in the open position, insertion or removal of pin 104 may be possible.

Figure 2A:
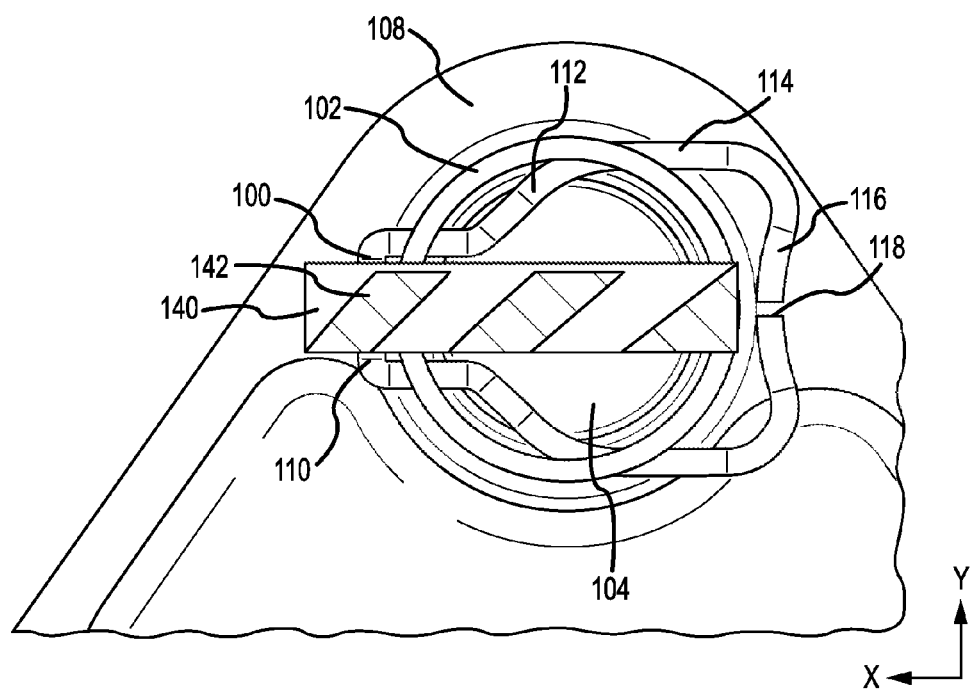
FIG. 2A illustrates a retention clip with a cam handle in a closed position, in accordance with various embodiments.

In various embodiments, and with reference to FIG. 2A, a retention clip 100 with a cam handle 140 is shown in a closed position similar to the closed position of FIG. 1A. Cam handle 140 is attached at handle section 110 of retention clip 100. Cam handle 140 may include a visual indicator that retention clip 100 is in the closed position. In that regard, cam handle 140 may include high-visibility indicator 142 of a different color than cam handle 140. For example, high-visibility indicator 142 may comprise yellow stripes against a black backdrop.

Figure 2B:
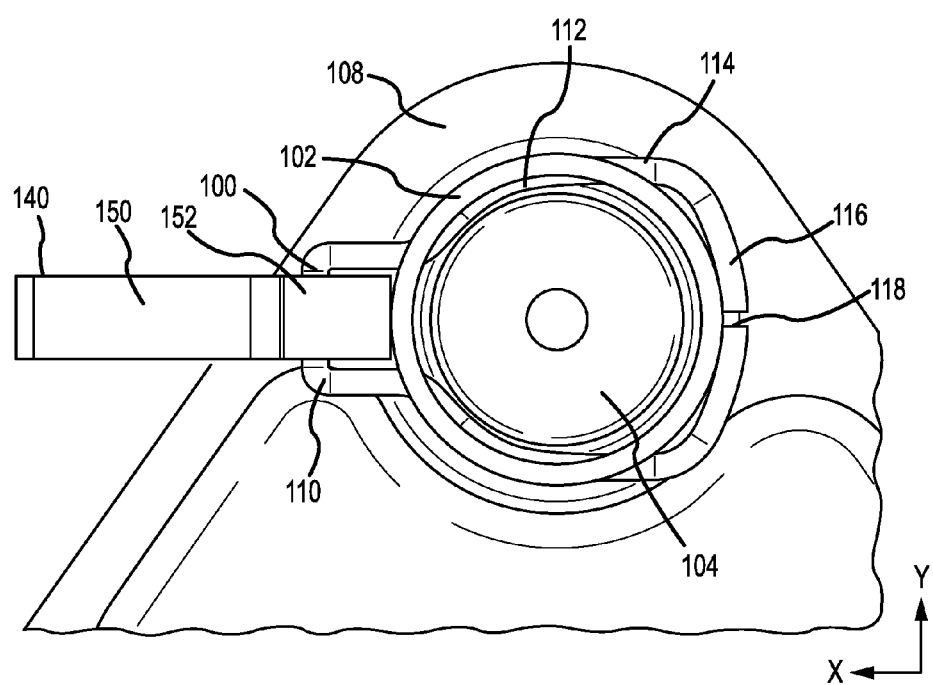
FIG. 2B illustrates a retention clip with a cam handle in an open position, in accordance with various embodiments.

With reference to FIG. 2B, a retention clip 100 with cam handle 140 is shown in an open position similar to the open position of FIG. 1B. Cam 152 of cam handle 140 comprises an opening through which handle section 110 of retention clip 100 travels. In that regard, handle section 110 defines an axis of rotation that cam handle 140 turns about between the open and closed positions. The axis of rotation defined by handle section 110 extends in the y direction. Cam handle 140 may be rotated around handle section 110 of retention clip 100 with cam 152 pressing against housing 102 and cam handle 140 moving away from spring section 116 of retention clip 100. Thus, cam 152 of cam handle 140 translates the angular motion of cam handle 140 (rotating around the axis extending in the y direction) into linear motion of handle section 110 (in the x direction). Handle section 110 is pulled away from spring section 116 to translate elbow section 112 in the direction of handle section 110 and open entry/exit path to insert and/or remove pin 104 is created.

In various embodiments, cam handle 140 may comprise a warning indicator 150. When cam handle 140 is in an open position, a warning indicator 150 may be visible to indicate that retention clip 100 is open. For example, warning indicator 150 may be a red surface that contrasts with high-visibility indicator 142 (indicating the retention clip is closed in FIG. 2A). The contrast between warning indicator 150 and high-visibility indicator 142 enables easy determination of whether retention clip 100 is in an open or closed position.

Figure 2C:
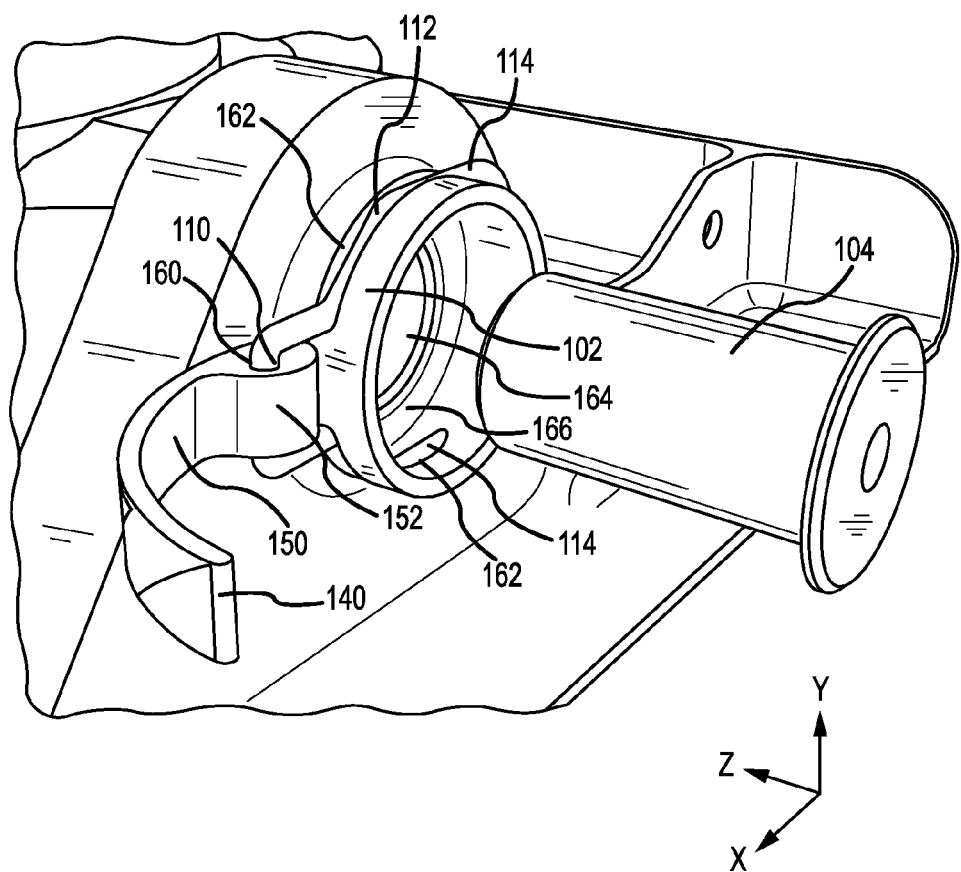
FIG. 2C illustrates a retention clip in an open position with a pin being removed or installed, in accordance with various embodiments.

With reference to FIG. 2C, a perspective view of retention clip 100 in an open position is shown with pin 104 being inserted and/or removed from housing 102, in accordance with various embodiments. Opening 160 in cam 152 provides an opening for handle section 110 to pass through cam 152. Opening 160 may act as a hinge for cam handle 140 to rotate around handle section 110 (as shown in FIG. 2B).

In various embodiments, housing 102 defines slots 162. Slots 162 of housing 102 may be configured to receive elbow section 112 of retention clip 100. Slots 162 may extend partially around a surface defining the opening of housing 102. Elbow section 112 of retention clip 100 in a closed position may tend to block the opening of housing 102 by moving further into slot 162 than when retention clip 100 is in the open position. When retention clip 100 is in an open position, elbow section 112 may tend to leave opening of housing 102 unobstructed by moving further out slot 162 than when retention clip 100 is in the closed position. A first elbow section may be disposed on a first side of housing 102 while a second elbow section is disposed on a second side of housing 102 opposite the first housing. The first and second elbow sections 112 may be symmetric about an axis extending in the x direction half way between the first and second elbow sections 112.

In various embodiments, the opening defined by housing 102 may terminate at lip 166. Lip 166 may have an inner diameter 164 that allows a portion of pin 104 to extend through housing 102. When inserted into housing 102, pin 104 may include a head to press against lip 166 with a portion of pin 104 extending through inner diameter 164.

Figure 3:
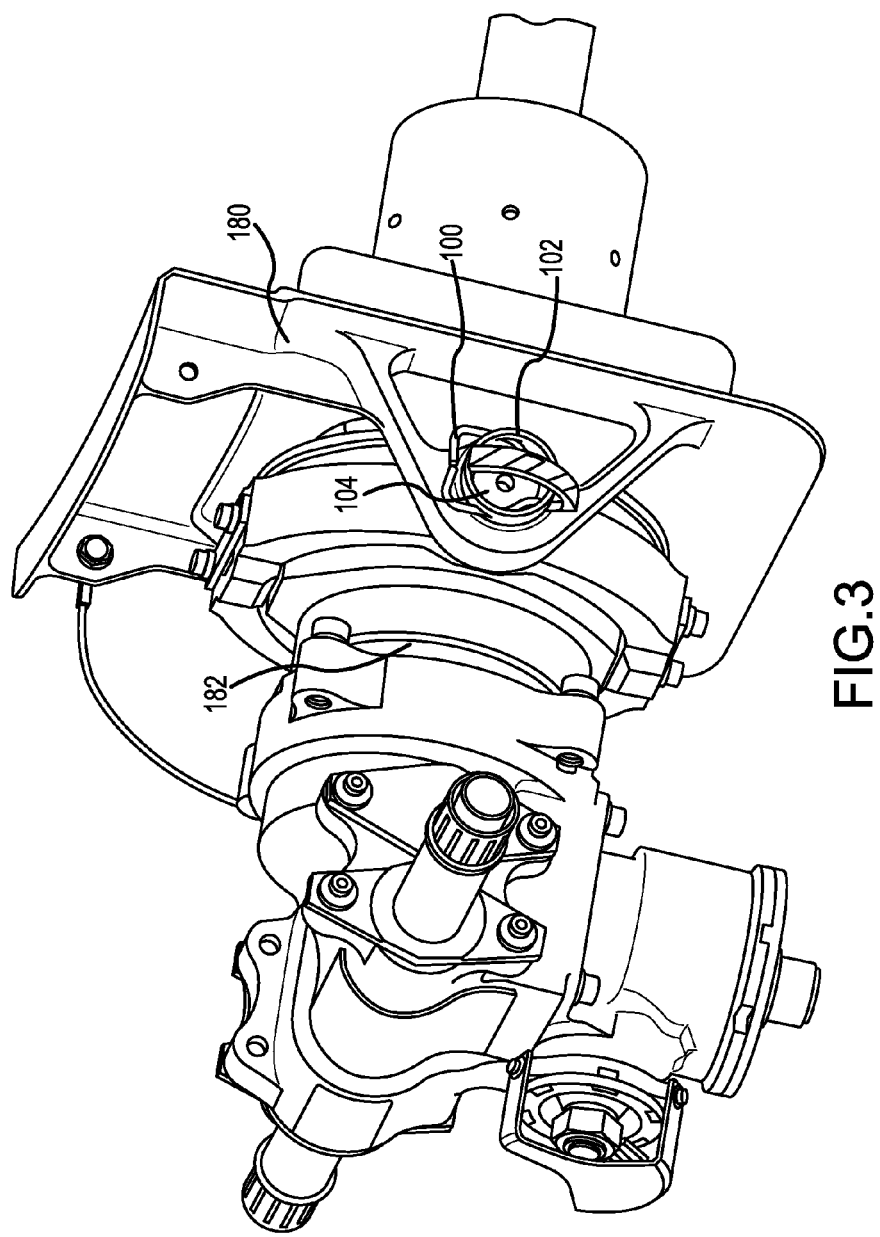
FIG. 3 illustrates a retention clip holding a pin in place to secure a reverse-thrust actuator, in accordance with various embodiments.

With reference to FIG. 3, a reverse-thrust actuator 182 is shown mounted on mounting fitting 180, in accordance with various embodiments. Mounting fitting 180 comprises housing 102 with retention clip 100 installed on housing 102 (as shown in greater detail in FIG. 2A). Pin 104 may be inserted in housing 102 of mounting fitting 180. Retention pin 104 may extend through mounting fitting 180 and into reverse-thrust actuator 182. A similar pin, clip, and housing may be implemented on the other side of reverse-thrust actuator 182 so that two pins may fix reverse-thrust actuator 182 in place. Although pin 104, housing 102, and retention clip 100 are shown securing reverse-thrust actuator 182 to mounting fitting 180, retention clip 100 may secure any pin or other component where fast and easy replacement is desired. The retention clip 100 has been illustrated in use to retain pin 104 for a thrust reverser actuator, but of course retention clip 100 can be used in many other environments. In various embodiments, a single pin 104 or any number of pins 104 may be used to hold a component in place using retention clip 100 and housing 102.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A retention clip, comprising:
   a spring section;
   a first elbow section extending from the spring section;
   a handle section extending from the first elbow section;
   a second elbow section opposite the first elbow section, the second elbow section extending between the handle section and the spring section, wherein the spring section is configured to bias the handle section towards the spring section; and a cam handle rotatably coupled to the handle section and configured to translate angular motion of the cam handle into linear motion of the handle section.

2. The retention clip of claim 1, wherein the cam handle comprises a visual indicator configured to indicate whether the cam handle is in a closed position.

3. The retention clip of claim 1, further comprising an opening defined by the spring section.

4. The retention clip of claim 1, wherein the spring section is configured to load in response to a force applied to the handle section.

5. The retention clip of claim 1, wherein a central portion of the spring section is closest to the handle section as a result of the retention clip being in a closed position.

6. A retention assembly, comprising:
   a mounting fitting;
   a housing disposed in the mounting fitting and defining a perimeter of an opening; and
   a retention clip disposed around the housing and comprising:
      an elbow section extending into the perimeter to obstruct the opening;
      a handle section extending from the elbow section and configured to move the elbow section out of the slot;
      a cam handle rotatably coupled to the handle section and configured to translate angular motion of the cam handle into linear motion of the handle section; and
      a spring section extending from the elbow section and configured to bias the handle section towards the spring section.

7. The retention assembly of claim 6, wherein the housing defines a slot and wherein the elbow section extends into the slot.

8. The retention assembly of claim 7, further comprising a cam handle configured to rotate about the handle section.

9. The retention assembly of claim 8, wherein the cam handle comprises a visual indicator configured to indicate whether the cam handle is in a closed position.

10. The retention clip of claim 9, wherein the spring section is discontinuous.

11. The retention clip of claim 9, wherein the spring section is configured to load in response to a force applied to the handle section.

12. The retention clip of claim 6, further comprising a pin disposed in the housing and held within the opening by the retention clip.

\* \* \* \* \*